US011191091B2

(12) United States Patent
Wild et al.

(10) Patent No.: US 11,191,091 B2
(45) Date of Patent: Nov. 30, 2021

(54) FAIRNESS-ENHANCING FRAME STRUCTURE

(71) Applicant: Alcatel Lucent, Boulogne Billancourt (FR)

(72) Inventors: Thorsten Wild, Stuttgart (DE); Andre Fonseca Dos Santos, Stuttgart (DE); Husain Nizamuddin, Stuttgart (DE)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 14/392,294

(22) PCT Filed: May 28, 2014

(86) PCT No.: PCT/EP2014/061064
§ 371 (c)(1),
(2) Date: Dec. 23, 2015

(87) PCT Pub. No.: WO2014/206678
PCT Pub. Date: Dec. 31, 2014

(65) Prior Publication Data
US 2016/0205702 A1 Jul. 14, 2016

(30) Foreign Application Priority Data
Jun. 24, 2013 (EP) .................................... 13305861

(51) Int. Cl.
*H04W 72/12* (2009.01)
*H04W 74/00* (2009.01)
(Continued)

(52) U.S. Cl.
CPC ...... *H04W 72/1231* (2013.01); *H04B 7/2656* (2013.01); *H04L 1/18* (2013.01);
(Continued)

(58) Field of Classification Search
CPC ........... H04W 72/082; H04W 72/0446; H04W 16/14; H04W 48/06; H04W 72/1231;
(Continued)

(56) References Cited

U.S. PATENT DOCUMENTS 6,522,650 B1   2/2003   Yonge, III et al.
8,312,350 B2   11/2012  Fujimoto et al.
(Continued)

FOREIGN PATENT DOCUMENTS

CN   101897228 A   11/2010
CN   102318388 A   1/2012
(Continued)

OTHER PUBLICATIONS

International Search Report for PCT/EP2014/061064 dated Jul. 7, 2014.

*Primary Examiner* — Pao Sinkantarakorn
*Assistant Examiner* — Kabir U Jahangir
(74) *Attorney, Agent, or Firm* — Fay Sharpe, LLP

(57) ABSTRACT

A base station and a user equipment device and a method for sending data from the user equipment device to the base station is proposed. The method for transmitting data comprises the steps of determining disadvantageous transmission conditions for the user equipment device and if such disadvantageous transmission conditions are determined, transmitting data in a reserved frame.

15 Claims, 5 Drawing Sheets

(51) Int. Cl.
*H04W 74/08* (2009.01)
*H04W 52/02* (2009.01)
*H04B 7/26* (2006.01)
*H04L 1/18* (2006.01)

(52) U.S. Cl.
CPC ..... *H04W 52/0209* (2013.01); *H04W 74/004* (2013.01); *H04W 74/085* (2013.01); *Y02D 30/70* (2020.08)

(58) Field of Classification Search
CPC ............ H04W 74/004; H04W 74/085; H04W 52/0209; H04B 7/2656; H04L 1/18; H04L 1/0007; H04L 1/1825; H04L 1/1671; Y02D 30/70
See application file for complete search history.

(56) References Cited

U.S. PATENT DOCUMENTS

| | | | |
|---|---|---|---|
| 2008/0002617 A1* | 1/2008 | Peisa | H04W 72/1231 370/329 |
| 2009/0131065 A1* | 5/2009 | Khandekar | H04W 72/082 455/452.1 |
| 2010/0008282 A1 | 1/2010 | Bhattad et al. | |
| 2010/0150056 A1* | 6/2010 | Iwai | H04W 74/0866 370/328 |
| 2012/0028645 A1* | 2/2012 | Kim | H04W 48/06 455/444 |
| 2013/0143548 A1 | 6/2013 | Rayavarapu et al. | |

FOREIGN PATENT DOCUMENTS

| | | |
|---|---|---|
| EP | 2 398 266 A2 | 12/2011 |
| GB | 2 314 487 A | 12/1997 |
| WO | WO 2008/057270 A2 | 5/2008 |
| WO | WO 2008/120275 A1 | 10/2008 |
| WO | WO 2009/065075 A1 | 5/2009 |
| WO | WO 2012/046016 A1 | 4/2012 |
| WO | WO 2012/096049 A1 | 7/2012 |
| WO | WO 2012/101394 A1 | 8/2012 |

* cited by examiner

FAIRNESS-ENHANCING FRAME STRUCTURE

FIELD OF THE INVENTION

The present invention relates to communication between user equipment devices and base stations in a cellular network.

BACKGROUND OF THE INVENTION

This section introduces aspects that may be helpful in facilitating a better understanding of the invention. Accordingly, the statements of this section are to be read in this light and are not to be understood as admission about what is in the prior art.

In enhanced 4G wireless systems and especially in future 5G wireless systems, a large number of devices, e.g. user equipment devices (UE), will be present in the coverage area of a base station, e.g. an eNodeB. For scenarios known by the paradigm "Internet of Things", it is predicted that a factor of 10 times to 100 times machines/sensors per user will be deployed up to 2020. Several applications for such machines will require nation-wide coverage and easy access to the internet. In the light of that, 3GPP has started up efforts on the extension of LTE for example for supporting machine transmission modes.

In the internet of things, a lot of small machine type communication devices are present and request access to the network sporadically. These user equipment devices have to be connected to the network in an energy efficient and fair way.

Slotted Aloha is a classical technology for contention-based access. The capabilities of modern receivers allow for so-called multi packet reception (MPR). MPR receivers can receive packets of multiple users correctly by multiuser detection techniques, like interference-cancellation and linear MMSE receivers. Such multi-antenna and/or multi-code system use e.g. direct-sequence code division multiple access (DS-CDMA) signal formats.

While slotted Aloha with MPR is a promising approach for machine type communication, e.g. with DS-CDMA, there are disadvantages in terms of fairness of throughput and energy efficiency for a subset of user equipment devices.

In scenarios where user equipment devices are distributed over certain cell areas (e.g. macro or micro cells), larger dynamic ranges of receive signal powers are occurring due to the near-far-effect.

In simulations it is observed that a certain percentage of user equipment devices, e.g. 20%, have a very large number of retransmissions and have a large delay for successful reception. Those user equipment devices have difficulties to get a fair access into the system. Under the paradigm of the internet of things, these user equipment devices are not mobile and will not be located in locations with better transmission conditions over time.

The large number of retransmissions costs a lot of battery power for those devices and also results in poor throughputs.

SUMMARY OF THE INVENTION

It is an object of the invention to provide a solution for the above mentioned problems and to enhance throughput and save battery power in the above described scenario.

The present invention concerns a method for transmitting data from a user equipment device to a base station in a wireless communication system. The data transmission is done in a frame structure comprising at least one regular frame and at least one reserved frame. In the user equipment device, disadvantageous transmission conditions are determined by checking the transmission link between the base station and the user equipment device. A disadvantageous transmission condition is present if a certain user equipment device has difficulties to transmit data to the base station, e.g. has a higher bit error rate than other user equipment devices or high packet losses. If no disadvantageous transmission condition is determined, the user equipment device transmits data in a regular frame. If such disadvantageous transmission conditions are determined, the user equipment device transmits data in a reserved frame. The reserved frame is a specific transmission frame dedicated to such disadvantageous devices to enhance their chances to successfully transmit data. This way, disadvantageous devices, which have worse transmission conditions, e.g. because of their physical location in a cell, are preferred by the system to be able to contribute to the overall system. This has the advantage that almost all devices in a cell may transmit data and are used and the devices are not disregarded because their transmission conditions are worse than the ones of other devices. Only devices with a certain distance to the base station or devices from which only low power signals are received at the base station are transmitting during the reserved frame time. Thus residual interference from practical interference cancellation receivers is relatively smaller. Practical receiver output performance depends on the impact of channel estimation. With realistic channel estimation, the interference cancellation leaves residual errors in the remaining signal. These errors are important when the dynamic range of the different user equipment devices is large, as then disadvantageous user equipment devices especially suffer in terms of packet error rate performance.

In one embodiment, disadvantageous transmission conditions are determined if a signal received from the base station is below a threshold. Thus, the transmission conditions between the base station and the user equipment device are tested directly and the connection quality is estimated this way. The base station transmits a test signal known to the user equipment device in advance, e.g. pilot, reference or training symbols. The user equipment device then by receiving and evaluating this signal decides if it is below a threshold, e.g. by estimating the receive power level of the serving cell. Further, also the receive power level of neighbor cells may be estimated and the relative power level difference may be used as a performance metric. In case the power level of the received signal is below the threshold, the user equipment device defines itself as a disadvantageous device. This way, system overhead for realizing the method is kept low, as no additional signaling exchange between base station and user equipment device is required to enable the user equipment device to decide that it is a disadvantageous device.

In one embodiment, disadvantageous transmission conditions are determined if a number of unsuccessful transmission attempts have been made within a predefined time. The user equipment device determines that transmitting data is difficult by counting a certain number of unsuccessful attempts, e.g. automated repeat request (ARQ) retransmissions and then defines itself as disadvantageous device.

In one embodiment, if a user equipment device has determined that it is a disadvantageous device, the user equipment device requests access to the reserved frames. In one embodiment, this is done via a request on an uplink control channel. Such a request may contain additional information, e.g. the number of unsuccessful attempts, the signal strength of the test signals received from the base station, importance of the data to be sent, remaining energy level of the user equipment device. This has the advantage that the base station may prioritize the request according to the additional information received from the user equipment devices, if multiple user equipment devices send such requests.

In one embodiment, parameters for determining disadvantageous transmission conditions are broadcast by the base station. Such parameters may be the number of times a user equipment device may try to attempt the network unsuccessfully within a certain time until it determines itself as a disadvantageous device. Further, such parameter may be the signal strength of the test signal received from the base station to determine that the user equipment device is a disadvantageous device. By broadcasting such parameters when setting up the system or on a regular basis, the user equipment devices theirselves have enough information to make a dedicated decision whether they are disadvantageous devices and are candidates as reserved frame users.

In one embodiment, the reserved frames are frames with a lower packet error rate than other frames. In one embodiment, the lower packet error rate is achieved in that the reserved frames are longer than other frames. The solution of longer frame duration is analogous to boosting the power of disadvantageous devices. Nevertheless the power range of very cheap devices is very limited, and on top of that, the battery lifetime is very critical. Therefore, enhancing the frame duration is advantageous compared to power control solutions. Further, this has the advantage of reduced dynamic range of receive signal power levels during the reserved frame period. In one embodiment, in which code division multiple access (CDMA) is used, the longer frame duration corresponds to a higher spreading factor, which increases the spreading gain of the user and thus reduces the packet error rate.

In one embodiment, a multi-carrier transmission system is used. A multi-carrier transmission system provides differentiation in time and frequency space and transmission is realized via subcarriers and groups of subcarriers, the physical resource blocks. Thus, by reserving such physical resource blocks for disadvantageous users, a set of subcarriers are dedicated to such users and the rest of the radio resource is used by other users. A multi-carrier transmission system may be OFDM, multi-carrier CDMA, filter bank based multi-carrier (FBMC), IOTA-OFDM or any kind of multi-carrier modulation signal format with CDMA or spreading on top. In this context, the term frame is to be understood as a realization of a multiple access resource in the time, frequency and code dimension.

In one embodiment, random access based transmission is used. A frame structure is provided for transmitting data via a slotted ALOHA protocol. At least one first time slot comprising a regular frame is provided for transmission of data of user equipment devices which are not disadvantageous. Further, at least one second time slot comprising a reserved frame is provided for transmission of data of user equipment devices which are disadvantageous.

According to one aspect of the invention, a method for receiving data by a base station in a wireless transmission system is proposed. A data stream originating from a user equipment device is received at a base station. The data stream contains multiple frames, e.g. in a multi-carrier transmission system the data stream contains a set of subcarriers in the form of physical resource blocks. The frame structure comprises at least one regular frame and at least one reserved frame. In one step, it is determined if the received data stream contains data in a reserved frame originating from devices with disadvantageous transmission conditions. If the received data stream contains data in a reserved frame, the data in the reserved frame is processed. Processing of the data received in the reserved frame may be like processing any other data or there may be specific constraints e.g. because the reserved frames have another frame duration or the error coding in the reserved frame may be different or the like.

In one embodiment, the method for receiving data further receives a request by a user equipment device for allowance to access reserved frames. In response, allowance for using/accessing the reserved frames is granted if the conditions are fulfilled and the corresponding information is submitted. The conditions for granting access to reserved frames are fulfilled in case the user equipment device is really a disadvantageous device. Conditions in which case the base station assumes that the user equipment device is a disadvantageous device are, e.g. the number of unsuccessful attempts, the signal strength of the test signals received from the base station, importance of the data to be sent, remaining energy level of the user equipment device or the like. The user equipment devices compare their respective values for these conditions with given parameters and decide theirselves if they are disadvantageous devices. In one embodiment, the corresponding parameters are broadcast by the base station when initiating a cell or on a regular basis.

According to one aspect of the invention, a device for transmitting data according the above described methods is proposed. The device comprises a transmission condition controller for determining disadvantageous transmission conditions. Further, the device comprises decision means for deciding to transmit data in a reserved frame of a frame structure comprising at least one regular frame and at least one reserved frame if disadvantageous transmission conditions are determined. Further, the device comprises a transmitter for transmitting data in a reserved frame.

According to one aspect of the invention, a base station for performing the above described methods is proposed. The base station comprises at least a receiver for receiving a data stream. Further, the base station comprises a data controller for determining if the received data stream contains data in reserved frames of a frame structure comprising at least one regular frame and at least one reserved frame. Further, the device comprises a processor for processing the data received in the reserved frame.

BRIEF DESCRIPTION OF THE DRAWINGS

Some embodiments of apparatus and methods in accordance with embodiments of the present invention are now described, by way of examples only, and with reference to the accompanying drawings, in which.

DETAILED DESCRIPTION OF PREFERRED EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
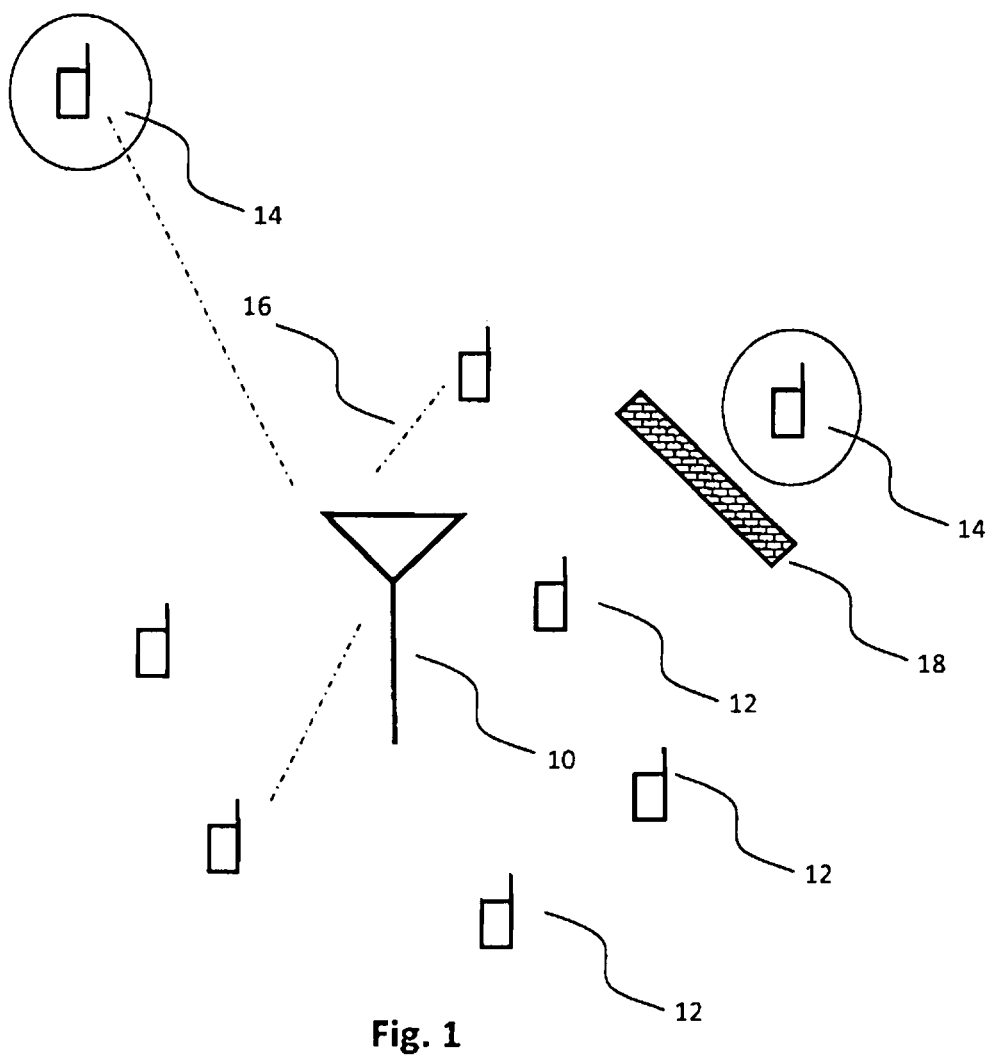
FIG. 1 shows a machine type communication scenario

FIG. 1 shows a machine type communication scenario according to a preferred embodiment, comprising a first device, e.g. a base station 10 in a 4G wireless system or a 5G wireless system, and associated user equipment devices 12, 14, e.g. sensor devices or the like. The term user equipment device 12, 14 is to be understood to cover sensor devices in a sensor network, other known user equipment devices like mobile phones, which might transmit and receive data with or without the interaction of a human being and other fixed installed or mobile communication devices able to transmit and receive data. The user equipment devices 12, 14 and the base station 10 are located within the communication range of these devices and communication is performed via a transmission channel 16, which is e.g. a wireless transmission channel. A multi-carrier system is used for communication between the base station 10 and the user equipment devices 12, 14, e.g. an OFDM, SC-FDMA or FBMC system with resource allocation in transmission time intervals and frequency resources.

In scenarios where devices are distributed over certain cell areas (e.g. macro or micro cells), larger dynamic ranges of receive signal powers are occurring due to the near-far-effect. Some user equipment devices within the cell coverage of a base station 10 are considered as disadvantageous user equipment devices 14. Because of obstacles 18 blocking the direct wireless connection between a disadvantageous user equipment device 14 and a base station 10 or because the disadvantageous user equipment device 14 is relatively far away from the base station at the edge of a wireless cell, these user equipment devices 14 have difficulties in transmitting data without the need of many retransmission.

Figure 2:
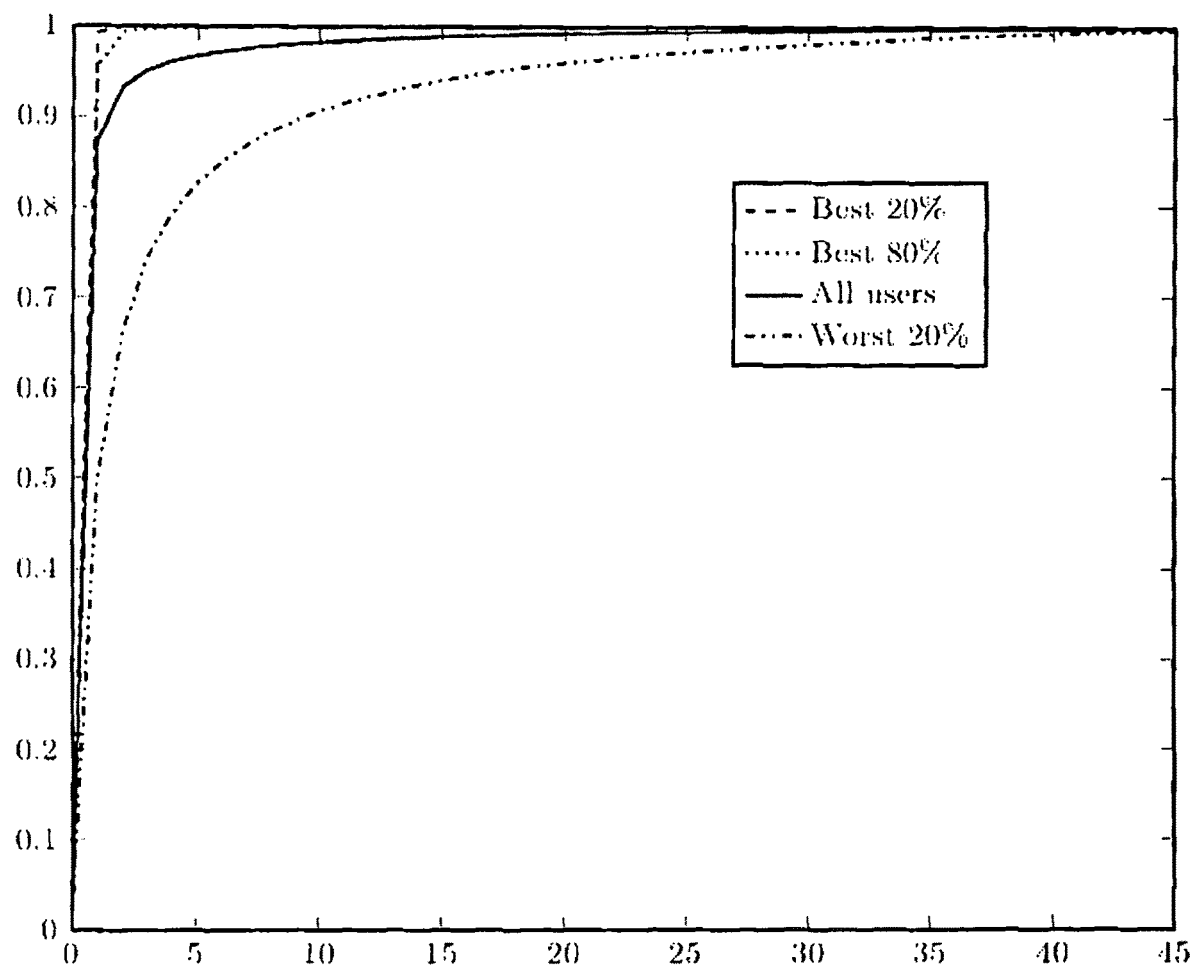
FIG. 2 shows the delay for successful reception in an exemplary machine type scenario
Figure 3:
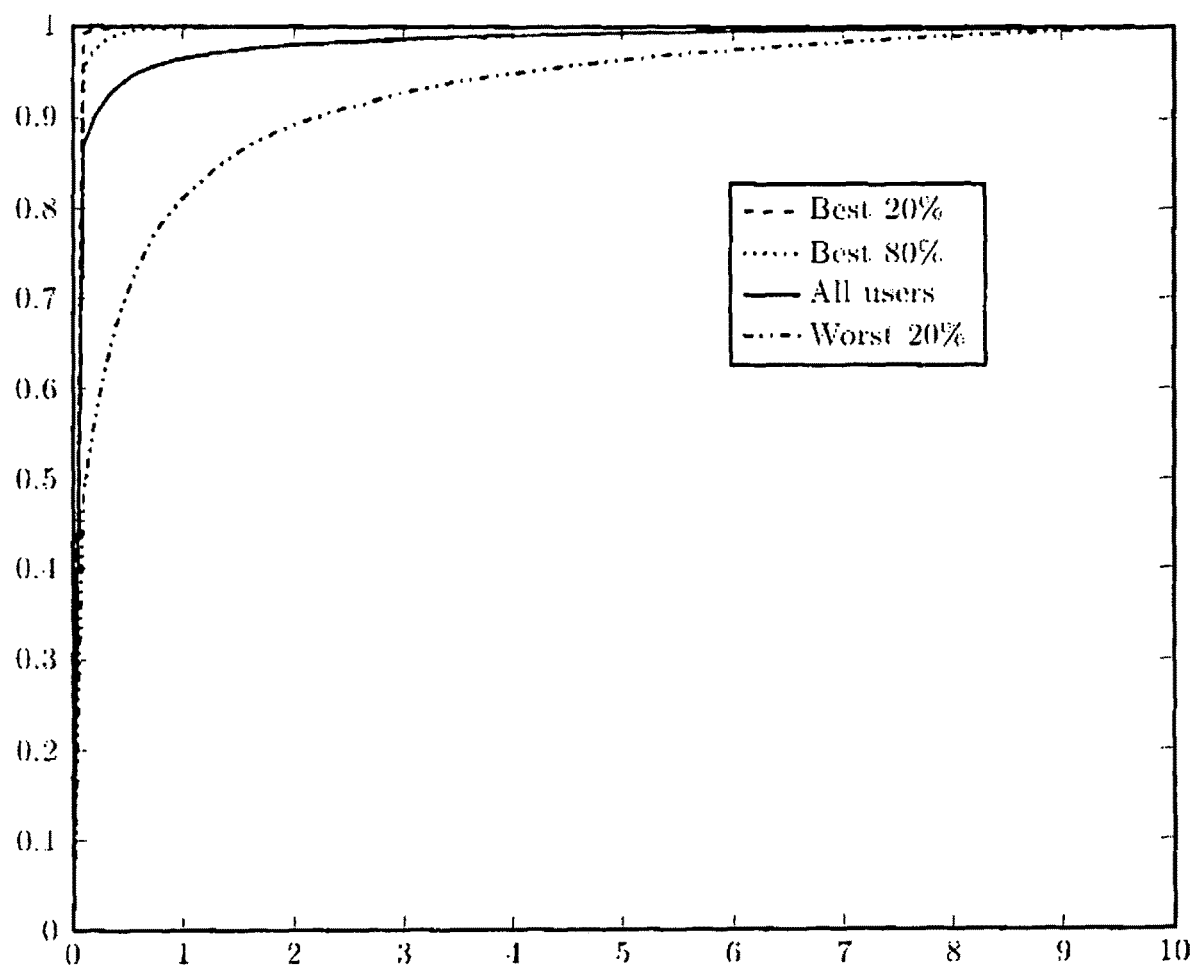
FIG. 3 shows the number of retransmission attempts for successful reception in an exemplary machine type scenario

FIG. 2 discloses a simulation of an exemplary scenario, showing that a certain percentage of disadvantageous user equipment devices 14, e.g. 20%, have a large number of retransmissions. This results in a large delay for successful reception, which is disclosed in FIG. 3. Those disadvantageous user equipment devices 14 have difficulties to get a fair access into the system. The reason is e.g. the residual interference from non-ideal interference cancellation of a real multi packet reception with real channel estimation. If the receiver uses successive interference cancellation (SIC), errors in the residual signal occur when cancelling out the devices with strong receive signals from the superimposed receive signal. This is due to inaccuracies in channel knowledge. In SIC, weakest devices are detected last. The accumulated errors from the previously cancelled devices increase the probability that the packets are not correctly decoded.

Figure 4:
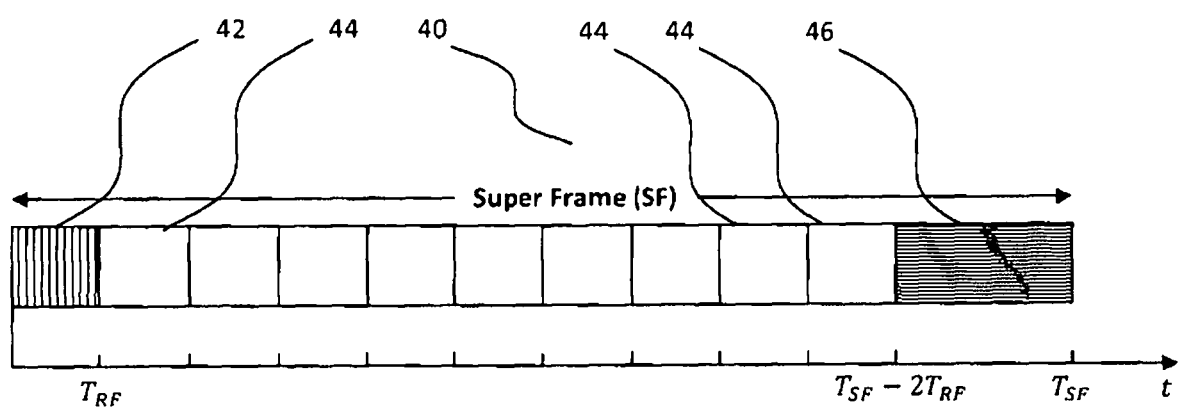
FIG. 4 shows a frame structure according to the invention including reserved frames FIG. 5 schematically illustrates the inventive method

FIG. 4 discloses a frame structure, a superframe 40 for communication between a base station 10 and a user equipment device 12, 14 via a wireless communication link 16. The frame structure 40 includes an uplink control frame 42, regular frames 44 and a reserved frame 46 dedicated to disadvantageous user equipment devices 14, which have according to their geographical location in the cell or for any other reasons difficulties to communicate with the base station 10. These difficulties may appear in a high bit error rate for these user equipment devices 14 and/or a large number of retransmissions before a transmission will have been successfully finished. Only the disadvantageous user equipment devices 14 are allowed to access or at least are preferred in accessing the reserved frame 46. In one embodiment, also multiple reserved frames 46 may be provided in a superframe 40. The superframe 40 disclosed in FIG. 4 is used e.g. in a slotted ALOHA CDMA system. The time slots are defined for random access based transmission of data and are used as uplink control frame 42, regular frames 44 or reserved frames 46. In one embodiment, the reserved frame 46 has a longer duration than the other frames, e.g. twice as long as a regular frame as depicted in FIG. 4.

Figure 5:
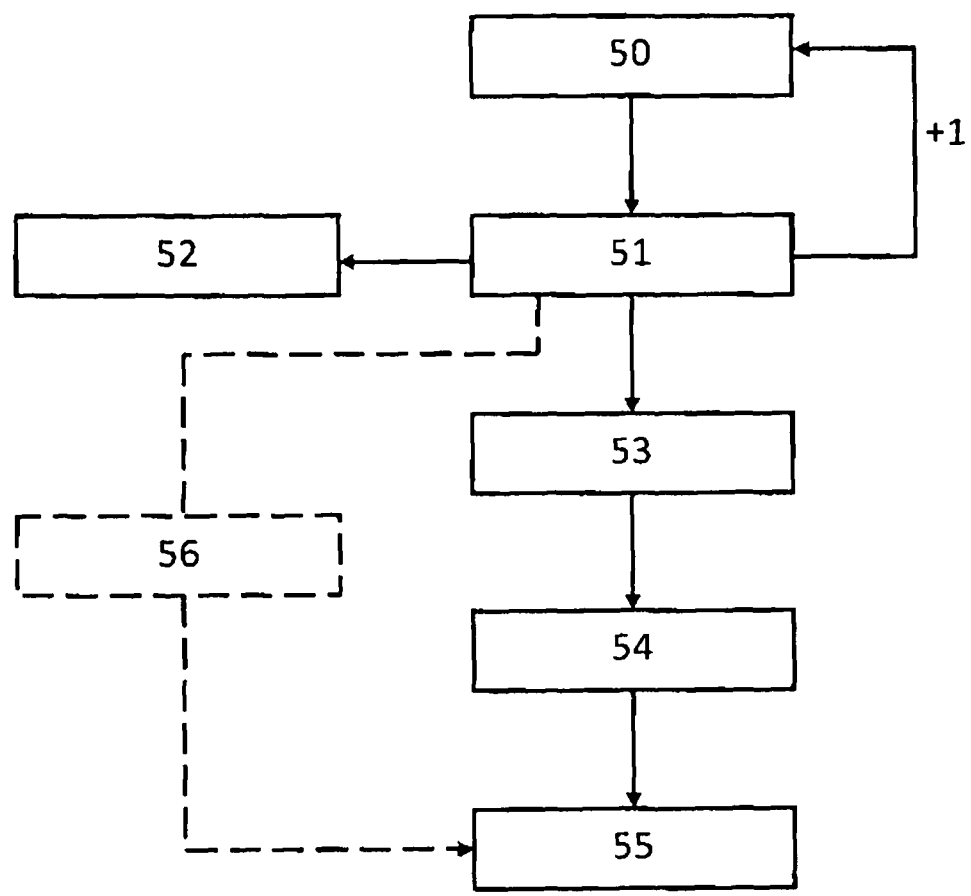

FIG. 5 illustrates a method for transmitting data in a system using reserved frames 46 for disadvantageous user equipment devices 14. In step 50, a user equipment device 12, 14 transmits its data and ID to the base station 10 within a timeslot of a regular frame 44 when a communication should be performed. In step 51, the user equipment device checks if an acknowledgement (ACK) is received from the base station 10. If an ACK is received, the transmission is completed and the method terminates in step 52. If no ACK is received, the user equipment device 12, 14 checks how many attempts have been made so far to transmit the data, and if the number of attempts is lower than a predefined number, the user equipment device 12, 14 increases the number of unsuccessful attempts by one and goes back to step 50 in order to transmit the data and ID again. The retransmission may take place a predefined time or a randomly defined time after the previous attempt. If the number of transmission attempts exceeds the predefined number, the user equipment device 14 decides to be a disadvantageous user equipment device 14. Then, in step 53 a request for transmission in a reserved frame 46 is sent to the base station via the uplink control frame 42. In one embodiment, the uplink control channel on which the uplink control frames 42 are transmitted has extended duration in order to allow efficient communication from the disadvantageous user equipment devices 14. The base station 10 then decides about the request and the user equipment device 14 receives in step 54 an acknowledgement from the base station 10 for sending data in the reserved frames 46. In one embodiment, the acknowledgment is transmitted with optional extra configurations for disadvantageous user equipment devices 14. A downlink control channel may be used here. In step 55, the user disadvantageous user equipment device 14 transmits its data in the reserved frame 46.

In one embodiment, the step 53 of requesting transmission in a reserved frame 46 and the step 54 for receiving an acknowledgment for transmission in a reserved frame 46 are omitted. Instead, the disadvantageous user equipment device 14 whose transmission attempts exceeds a predefined number accesses the reserved frame 46 without a special uplink request to the base station. Instead, it received repeatedly information regarding the reserved frame 46 communication or has this information stored. The control information may contain but is not limited to the predefined number of failed attempts until the machine can access the reserved frames 46, and further configurations for accessing the reserved frames 46, such as contention probability and maximum retransmissions. The information is evaluated in step 56, and then the disadvantageous user equipment device 14 just sends the data in the reserved frame 46 in step 55. Thus, control information transmitted over the network is reduced.

In one embodiment, multi-carrier CDMA is used and a set of subcarriers (physical resource blocks) is reserved for the disadvantageous user equipment devices 14. The rest of the band may be used by the other user equipment devices 12, which are not necessarily machine to machine communication devices. Different codes and subcarriers may be used for the reserved frames 46.

While multi-carrier CDMA may be understood in the art as OFDM with additional spreading on top of the OFDM resource elements, within the scope of this disclosure with the expression multi-carrier CDMA is to be interpreted more general, e.g. as a combination of CDMA/spreading with any kind of multi-carrier modulation signal format, like FBMC (filter bank based multi-carrier) or IOTA-OFDM.

The functions of the various elements shown in the Figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, the functions may be provided, without limitation, by digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The invention claimed is:

1. A method implemented in a user equipment for random access transmission in a frame structure comprising physical resource blocks, the method comprising:
   receiving a broadcast including one or more parameters for determining disadvantageous transmission conditions;
   determining in the user equipment disadvantageous transmission conditions based on at least one of the parameters included in the received broadcast,
   if no disadvantageous transmission condition is determined by the user equipment, transmitting in a first set of physical resource blocks within the frame structure, and
   if disadvantageous transmission conditions are determined by the user equipment, transmitting in a second set of physical resource blocks within the frame structure;
   wherein the second set of physical resource blocks is longer than the first set of physical resource blocks; and
   wherein disadvantageous transmission conditions are determined by counting unsuccessful transmission attempts, and disadvantageous transmission conditions are determined to exist if a counted number of unsuccessful transmission attempts made within a predefined time exceed a threshold.

2. The method for random access transmission according to claim 1, wherein disadvantageous transmission conditions are determined if a signal received from the base station is below a threshold.

3. The method for random access transmission according to claim 1, wherein the second set of physical resource blocks has a lower packet error rate than the first set of physical resource blocks.

4. The method for random access transmission according to claim 1, wherein a multi-carrier transmission system is used.

5. The method for random access based transmission according to claim 1, wherein a protocol for random access based transmission is used and at least one first time slot is provided for transmission of user equipment devices which are not disadvantageous in the first set of physical resource blocks and at least one second time slot is provided for transmission of user equipment devices which are disadvantageous in the second set of physical resource blocks.

6. The method for random access based transmission according to claim 5, wherein the time slots are defined for random access based transmission of data and are used as uplink control frame, regular frames or reserved frames.

7. The method for random access based transmission according to claim 1, wherein the second set of physical resource blocks is reserved for disadvantageous user equipment.

8. The method for random access based transmission according to claim 2, wherein disadvantageous transmission conditions are determined based on estimating the receive power level of the serving cell and/or the receive power level of neighbor cells.

9. The method for random access based transmission according to claim 1, wherein the second set of physical resource blocks has a longer duration than the first set of physical resource blocks.

10. The method for random access based transmission according to claim 1, wherein the second set of physical resource blocks is twice as long as the first set of physical resource blocks.

11. The method according to claim 2, wherein a value for the threshold is one of the parameters included in the received broadcast.

12. The method according to claim 1, wherein at least one of a value for the threshold and a value for the predefined time are parameters included in the received broadcast.

13. A user equipment for random access transmission in a frame structure comprising physical resource blocks, the user equipment comprising a memory storing computer readable instructions and a processor configured to execute the computer readable instructions, and configured to:
   receive a broadcast including one or more parameters for determining disadvantageous transmission conditions,
   determining determine disadvantageous transmission conditions based on at least one of the parameters included in the received broadcast,
   decide to transmit data in a first set of physical resource blocks of a frame structure comprising physical resource blocks if disadvantageous transmission conditions are determined, and
   transmit a random access based transmission in a second set of physical resource blocks;
   wherein the second set of physical resource blocks is longer than the first set of physical resource blocks; and
   wherein disadvantageous transmission conditions are determined by counting unsuccessful transmission attempts, and disadvantageous transmission conditions are determined to exist if a counted number of unsuccessful transmission attempts made within a predefined time exceed a threshold.

14. A method for transmitting data in a frame structure, said method performed in a user equipment, the frame structure comprising at least one first set of physical resource blocks and at least one second set of physical resource blocks, the method comprising:

receiving with the user equipment a broadcast, said broadcast including one or more parameters for determining disadvantageous transmission conditions, making a determination that the user equipment is either in a disadvantaged state or is not in the disadvantaged state based on at least one of the parameters included in the received broadcast, said determination being made by the user equipment itself based upon its own self-evaluation of a condition being experienced by the user equipment, if the user equipment makes the determination for itself that it is not in the disadvantaged state, said user equipment transmits data to a serving base station using the at least one first set of physical resource blocks, and if the user equipment makes the determination for itself that it is in the disadvantaged state, said user equipment transmits data to the serving base station using the at least one second set of physical resource blocks;

wherein the determination is made by the user equipment itself that it is in a disadvantaged state when, as evaluated by the user equipment itself, it is true that a number of unsuccessful transmission attempts counted by the user equipment within a defined time exceeds a transmission reattempt threshold.

15. A user equipment for transmitting data in a frame structure, the frame structure comprising at least one first set of physical resource blocks and at least one second set of physical resource blocks, the user equipment comprising a memory storing computer readable instructions and a processor configured to execute the computer readable instructions, and configured to:

receive a broadcast, said broadcast including one or more parameters for determining disadvantageous transmission conditions, and make a determination that the user equipment is either in a disadvantaged state or is not in the disadvantaged state based on at least one of the parameters included in the received broadcast, said determination being made by the user equipment itself based upon its own self-evaluation of a condition being experienced by the user equipment, wherein:

if the user equipment makes the determination for itself that it is not in the disadvantaged state, said user equipment transmits data to a serving base station using the at least one first set of physical resource blocks;

if the user equipment makes the determination for itself that it is in the disadvantaged state, said user equipment transmits data to the serving base station using the at least one second set of physical resource blocks; and the determination is made by the user equipment itself that it is in a disadvantaged state when, as evaluated by the user equipment itself, it is true that a number of unsuccessful transmission attempts counted by the user equipment within a defined time exceeds a transmission reattempt threshold.

* * * * *